(12) United States Patent
Lee et al.

(10) Patent No.: US 12,495,835 B2
(45) Date of Patent: Dec. 16, 2025

(54) AEROSOL GENERATING DEVICE (71) Applicant: KT&G CORPORATION, Daejeon (KR)

(72) Inventors: Jaemin Lee, Siheung-si (KR); Yong Hwan Kim, Anyang-si (KR)

(73) Assignee: KT&G CORPORATION, Daejeon (KR)

( * ) Notice: Subject to any disclaimer, the term of this patent is extended or adjusted under 35 U.S.C. 154(b) by 427 days.

(21) Appl. No.: 17/784,818

(22) PCT Filed: Jul. 12, 2021

(86) PCT No.: PCT/KR2021/008857
§ 371 (c)(1),
(2) Date: Jun. 13, 2022

(87) PCT Pub. No.: WO2022/014979
PCT Pub. Date: Jan. 20, 2022

(65) Prior Publication Data
US 2023/0000166 A1    Jan. 5, 2023

(30) Foreign Application Priority Data

Jul. 13, 2020    (KR) .................. 10-2020-0086433

(51) Int. Cl.
*A24F 40/51*    (2020.01)
*A24F 40/57*    (2020.01)

(52) U.S. Cl.
CPC .............. *A24F 40/51* (2020.01); *A24F 40/57* (2020.01)

(58) Field of Classification Search
None
See application file for complete search history.

(56) References Cited

U.S. PATENT DOCUMENTS

| 9,736,887 | B2 | 8/2017 | Chiu et al. |
| 10,143,232 | B2 | 12/2018 | Talon |
| 2010/0307518 | A1 | 12/2010 | Wang |
| 2017/0042227 | A1 | 2/2017 | Gavrielov et al. |
| 2018/0020728 | A1* | 1/2018 | Alarcon ............... H05B 1/0244 392/404 |

(Continued)

FOREIGN PATENT DOCUMENTS

| EP | 2217034 A1 | 8/2010 |
| EP | 2797448 A2 | 11/2014 |

(Continued)

OTHER PUBLICATIONS

Korean Office Action for 10-2020-0086433 dated Apr. 1, 2022.

(Continued)

*Primary Examiner* — Cynthia Szewczyk
(74) *Attorney, Agent, or Firm* — Sughrue Mion, PLLC (57) ABSTRACT An aerosol generating device includes a heater that heats an aerosol generating substrate, a temperature sensor that detects a temperature of the heater, and a controller that controls power supplied to the heater through a power signal such that the heater is heated within a preset temperature range, filters the power signal, and detects a user's puff based on the filtered power signal. Accordingly, the aerosol generating device according to the present disclosure may more accurately detect a user's puff.

11 Claims, 9 Drawing Sheets (56) References Cited

U.S. PATENT DOCUMENTS

| | | | |
|---|---|---|---|
| 2018/0286208 A1 | 10/2018 | Baker et al. | |
| 2019/0053540 A1 | 2/2019 | Baker et al. | |
| 2020/0060345 A1* | 2/2020 | Cao | H05B 1/0244 |
| 2020/0260791 A1 | 8/2020 | Lee et al. | |
| 2020/0305508 A1 | 10/2020 | Talon | |
| 2021/0137169 A1 | 5/2021 | Lee | |
| 2022/0211113 A1* | 7/2022 | Ruscio | A24F 40/20 |

FOREIGN PATENT DOCUMENTS

| | | |
|---|---|---|
| EP | 3597054 A1 | 1/2020 |
| EP | 3610747 A2 | 2/2020 |
| KR | 10-1488040 B1 | 1/2015 |
| KR | 10-2019-0051785 A | 5/2019 |
| KR | 10-2019-0075166 A | 6/2019 |
| KR | 10-1994762 B1 | 7/2019 |
| KR | 10-2019-0094979 A | 8/2019 |
| KR | 10-2020-0058087 A | 5/2020 |
| RU | 2 621 596 C2 | 6/2016 |
| RU | 2 678 437 C1 | 1/2019 |
| RU | 2 697 234 C1 | 8/2019 |
| WO | 2020/105874 A1 | 5/2020 |

OTHER PUBLICATIONS

Written Opinion of the International Searching Authority for PCT/KR2021/008857 dated Oct. 19, 2021 (PCT/ISA/237).

International Search Report for PCT/KR2021/008857 dated Oct. 19, 2021 (PCT/ISA/210).

Extended European Patent Office dated Nov. 9, 2022 in EP Application No. 21841302.9.

Russian Office Action dated Jul. 20, 2023 in Application No. 2022117054/03.

Communication dated Jan. 17, 2025 issued by the State intellectual Property Office of the P.R.China in application No. 202180007586.2.

Wang Quanxian, "Mechanical Equipment Fault Diagnosis Technology", Huazhong University Of Science And Technology Press, Sep. 2020, pp. 54-55 (8 pages total).

Office Action dated Jul. 22, 2025 in Chinese Application No. 202180007586.2.

* cited by examiner

AEROSOL GENERATING DEVICE

TECHNICAL FIELD

The present disclosure relates to an aerosol generating device, and more particularly, to an aerosol generating device capable of accurately detecting a user's puff.

BACKGROUND ART

Recently, there has been a need for an alternative to general cigarettes. For example, there is growing demand for an aerosol generating device that generates an aerosol by heating an aerosol generating material in a cigarette or a liquid storage, instead of combusting a cigarette.

Such an aerosol generating device has to accurately detect a user's puff to adjust a heating profile and to count the number of remaining puffs, but aerosol generating devices of the related art have a problem in that the user's puff may not be accurately detected.

DISCLOSURE

Technical Problem

An aerosol generating device needs to accurately detect a user's puff to adjust a heating profile and to count the number of remaining puffs.

The technical problem of the present disclosure is not limited to the above-described problem, and other technical problems may be inferred from the following examples.

Technical Solution

According to an aspect of the present disclosure, an aerosol generating device includes a heater that heats an aerosol generating substrate, a temperature sensor that detects a temperature of the heater, and a controller that controls power supplied to the heater through a power signal such that the heater is heated within a preset temperature range, filters the power signal, and detects a user's puff based on the filtered power signal.

Advantageous Effects

An aerosol generating device according to the present disclosure may detect a user's puff with only a power signal without a separate puff sensor.

In addition, when a filter is applied to a power signal, there is an advantage in that a filtered power signal is easily compared with a preset threshold.

In addition, an aerosol generating device sets a bandwidth of a filter by considering an average puff time of a user, and thus, a user's puff may be more accurately detected.

The effects of the present disclosure are not limited to the above-described effects, and undescribed effects will be clearly understood by those skilled in the art from the present specification and the accompanying drawings.

BEST MODE

According to an aspect of the present disclosure, an aerosol generating device includes a heater that heats an aerosol generating substrate, a temperature sensor that detects a temperature of the heater, and a controller configured to control power supplied to the heater through a power signal such that the heater is heated within a preset temperature range, filter the power signal, and detect a user's puff based on the filtered power signal.

In addition, the power signal may be a pulse width modulation signal.

In addition, the controller may increase a duty value of the pulse width modulation signal in response to a decrease in temperature of the heater.

In addition, the controller may include a band-pass filter configured to filter the power signal.

In addition, a center frequency of the band-pass filter may be set based on an average puff time of a user.

In addition, the average puff time may be 2 seconds.

In addition, a center frequency of the band-pass filter may be 0.125 Hz, a lower cutoff frequency may be 0.083 Hz, and higher cutoff frequency may be 0.25 Hz.

In addition, the band-pass filter may include a first low-pass filter and a second low-pass filter.

In addition, a first cutoff frequency of the first low-pass filter may be 0.25 Hz, and a second cutoff frequency of the second low-pass filter may be 0.083 Hz.

In addition, the controller may include the filtered power signal with a preset threshold and determine that the user's puff has occurred based on the filtered power signal being greater than or equal to the threshold.

MODE FOR INVENTION

With respect to the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

The term "cigarette" (i.e., when used alone without "general," "traditional," or "combustive") may refer to any article which has a shape similar to a traditional combustive cigarette. This cigarette may contain an aerosol generating material that generates aerosols by operation (e.g., heating) of an aerosol generating device.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, exemplary embodiments of the present invention will be described in detail with reference to the drawings.

Figure 1:
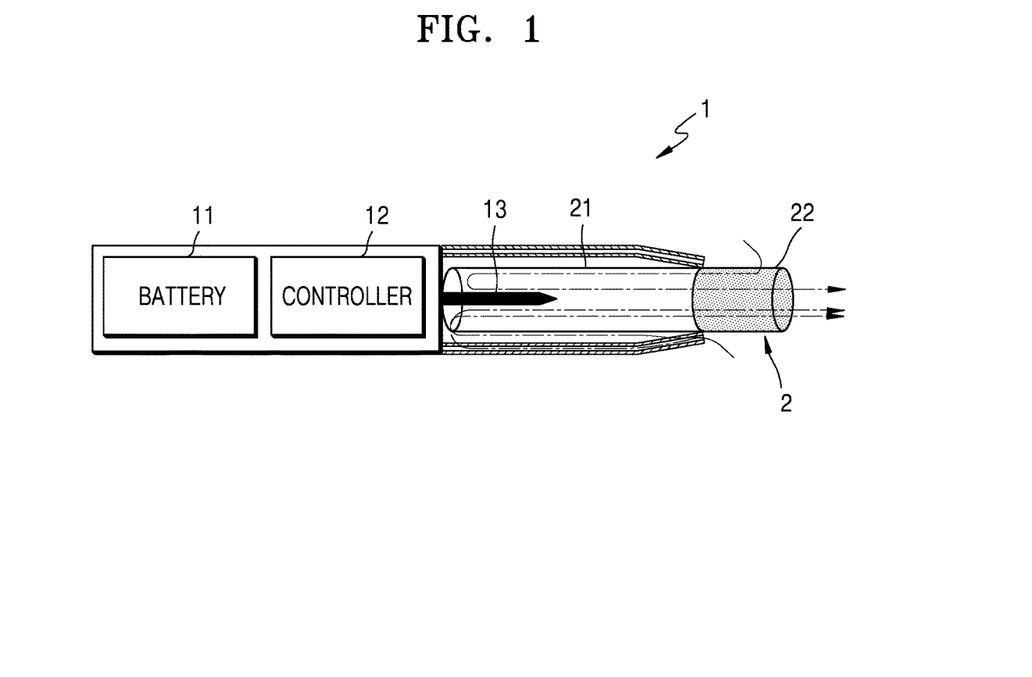
FIGS. 1 to 3 are views illustrating examples in which a cigarette is inserted into an aerosol generating device.
Figure 2:
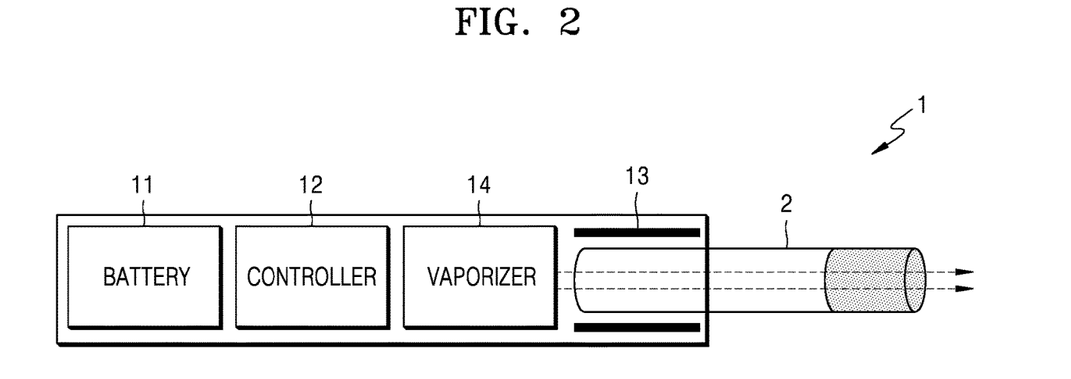
Figure 3:
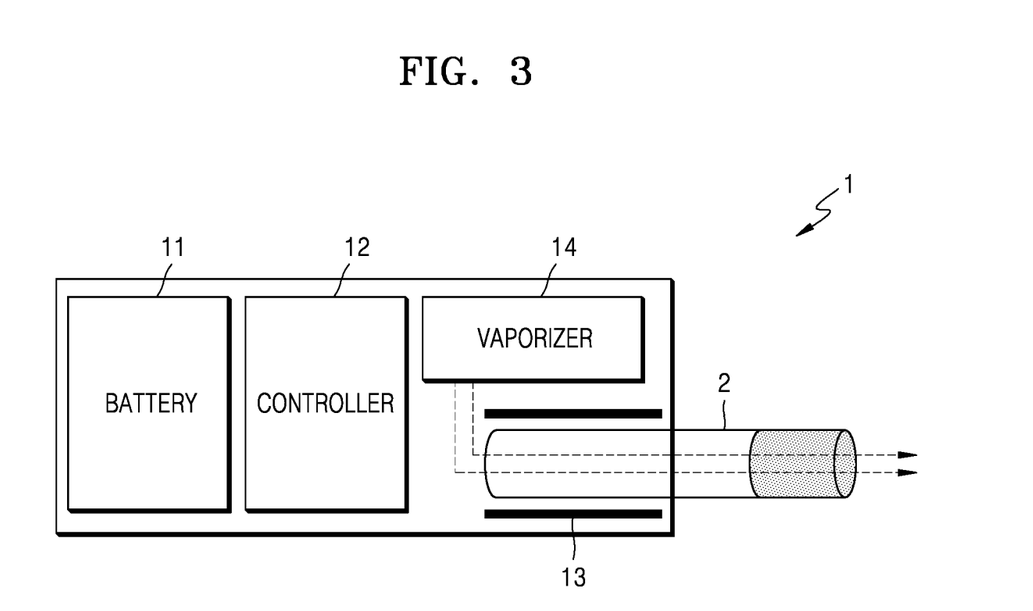

FIGS. 1 through 3 are diagrams showing examples in which a cigarette is inserted into an aerosol generating device.

Referring to FIG. 1, the aerosol generating device 1 may include a battery 11, a controller 12, and a heater 13. Referring to FIGS. 2 and 3, the aerosol generating device 1 may further include a vaporizer 14. Also, the cigarette 2 may be inserted into an inner space of the aerosol generating device 1.

FIGS. 1 through 3 illustrate components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIGS. 1 through 3.

Also, FIGS. 2 and 3 illustrate that the aerosol generating device 1 includes the heater 13. However, as necessary, the heater 13 may be omitted.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate an aerosol from the cigarette 2 and/or the vaporizer 14. The aerosol generated by the heater 13 and/or the vaporizer 14 is delivered to a user by passing through the cigarette 2.

According to necessity, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette 2 is inserted into the aerosol generating device 1, the heater 13 may be located outside the cigarette 2. Thus, the heated heater 13 may increase a temperature of an aerosol generating material in the cigarette 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 3 and may include various shapes.

The vaporizer 14 may generate an aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be detachable from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be wound around the liquid delivery element. The heating element may be heated by a current supply and may transfer heat to the liquid composition in contact with the heating element, thereby heating the liquid composition. As a result, an aerosol may be generated.

For example, the vaporizer 14 may be referred to as a cartomizer or an atomizer, but it is not limited thereto.

The aerosol generating device 1 may further include general-purpose components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor (e.g., a puff detecting sensor, a temperature detecting sensor, a cigarette insertion detecting sensor, etc.). Also, the aerosol generating device 1 may be formed as a structure where, even when the cigarette 2 is inserted into the aerosol generating device 1, external air may be introduced or internal air may be discharged.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar as a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1, or the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, the opening and closing and/or a size of the air passage formed in the aerosol generating device 1 may be adjusted by the user. Accordingly, the amount of smoke and a smoking impression may be adjusted by the user. As another example, the external air may flow into the cigarette 2 through at least one hole formed in a surface of the cigarette 2.

Hereinafter, an example of the cigarette 2 will be described with reference to FIG. 4.

Figure 4:
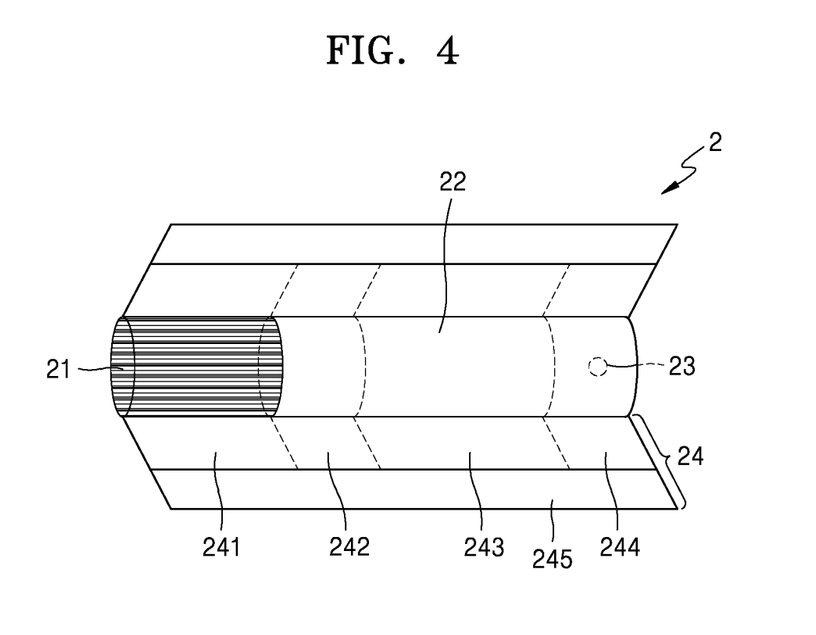
FIGS. 4 and 5 are views illustrating examples of a cigarette.

FIG. 4 illustrates an example of a cigarette.

Referring to FIG. 4, the cigarette 2 may include a tobacco rod 21 and a filter rod 22. The first portion 21 described above with reference to FIGS. 1 through 3 may include the tobacco rod 21, and the second portion 22 may include the filter rod 22.

FIG. 4 illustrates that the filter rod 22 includes a single segment. However, the filter rod 22 is not limited thereto. In other words, the filter rod 22 may include a plurality of segments. For example, the filter rod 22 may include a first segment configured to cool an aerosol and a second segment configured to filter a certain component included in the aerosol. Also, according to necessity, the filter rod 22 may further include at least one segment configured to perform other functions.

The cigarette 2 may be packaged by at least one wrapper 24. The wrapper 24 may have at least one hole through which external air may be introduced or internal air may be discharged. For example, the cigarette 2 may be packaged by one wrapper. As another example, the cigarette 2 may be double-packaged by at least two wrappers 24. For example, the tobacco rod 21 may be packaged by a first wrapper 241, and the filter rod 22 may be packaged by wrappers 242, 243, and 244. Then, the entire cigarette 2 may be packaged by another wrapper 245. When the filter rod 22 includes a plurality of segments, each segment may be packaged individually by wrappers 242, 243, and 244.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be made out of pipe tobacco, which is formed of tiny bits cut from a tobacco sheet. Also, the tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity applied to the tobacco rod may be increased and taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

Also, the filter rod 22 may include at least one capsule 23. Here, the capsule 23 may generate a flavor or an aerosol. For example, the capsule 23 may have a configuration in which a liquid containing a flavoring material is wrapped with a film. For example, the capsule 23 may have a spherical or cylindrical shape, but is not limited thereto.

Figure 5:
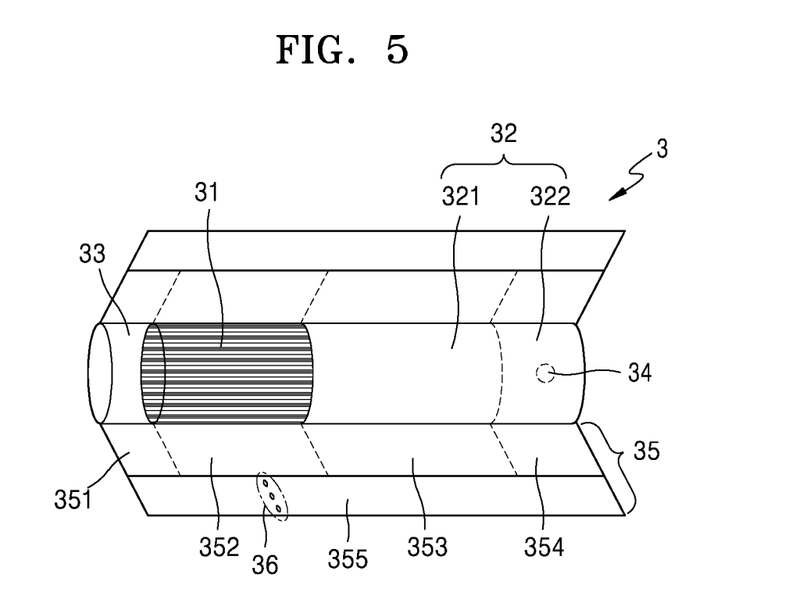

Referring to FIG. 5, the cigarette 3 may further include a front-end plug 33. The front-end plug 33 may be located on a side of the tobacco rod 42, the side not facing the filter rod 32. The front-end plug 33 may prevent the tobacco rod 31 from falling out and prevent a liquefied aerosol from flowing into the aerosol generating device 1 from the tobacco rod 31, during smoking.

The filter rod 32 may include a first segment 321 and second segment 322. Here, the first segment 321 can correspond to a first segment of a filter rod 22 of FIG. 4, and the second segment 322 can correspond to a third segment of a filter rod 22 of FIG. 4.

The diameter and total length of the cigarette 3 can correspond to the diameter and total length of the cigarette 2 of FIG. 4. For example, the length of the front-end plug 33 may be about 7 mm, the length of the tobacco rod 31 may be about 15 mm, the length of the first segment 321 may be about 12 mm, and the length of the second segment 322 may be about 14 mm, but it is not limited to this.

The cigarette 3 may be packaged by at least one wrapper 35. The wrapper 35 may have at least one hole through which external air may be introduced or internal air may be discharged. For example, the front-end plug 33 may be packaged by a first wrapper 351, and the tobacco rod 31 may be packaged by a second wrapper 352, and the first segment 321 may be packaged by a third wrapper 321, and the second segment 322 may be packaged by a fourth wrapper 354. Also, the entire cigarette 3 may be packaged by a fifth wrapper 355.

Also, the fifth wrapper 355 may have at least one hole 36. For example, the hole 36 may be formed in an area surrounding the tobacco rod 31, but is not limited thereto. The hole 36 may serve to transfer heat formed by the heater 13 shown in FIG. 2 and FIG. 3 to the inside of the tobacco rod 31.

Also, the second segment 322 may include at least one capsule 34. Here, the capsule 34 may generate a flavor or an aerosol. For example, the capsule 34 may have a configuration in which a liquid containing a flavoring material is wrapped with a film. For example, the capsule 34 may have a spherical or cylindrical shape, but is not limited thereto.

Figure 6:
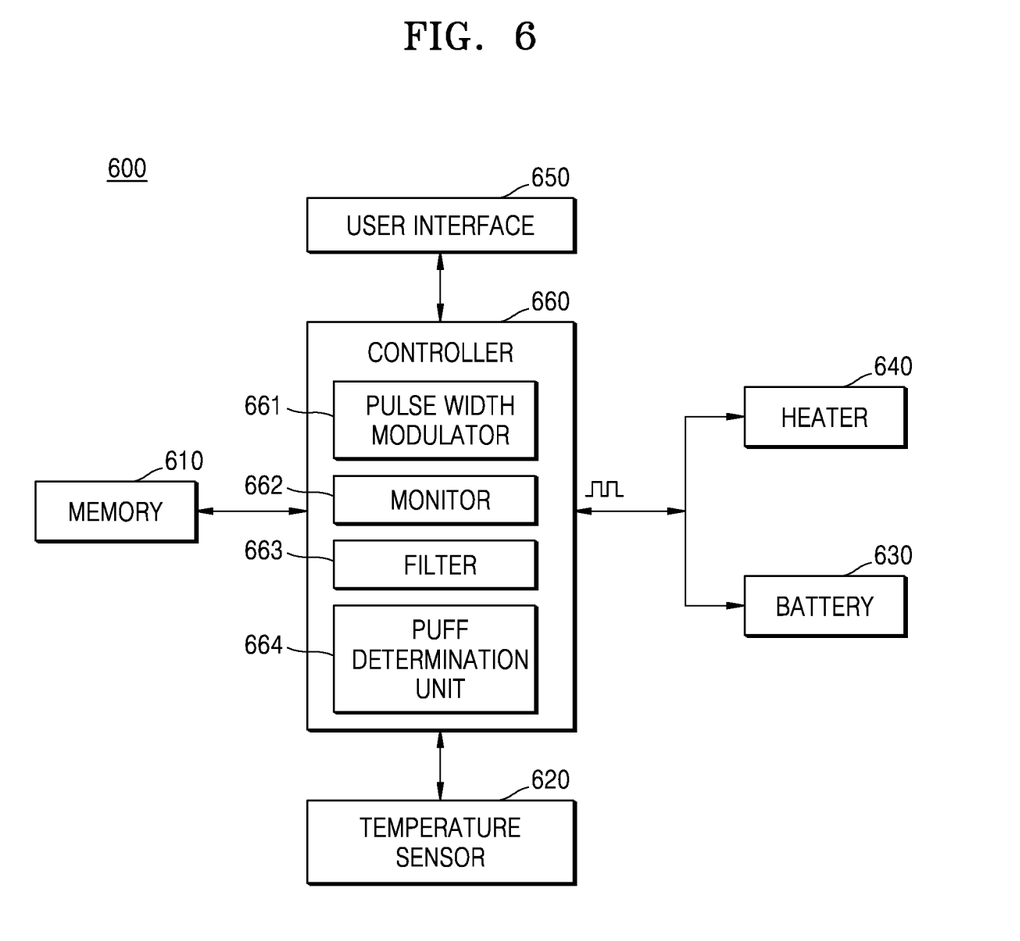
FIG. 6 is a block diagram of an aerosol generating device according to an embodiment.

FIG. 6 is a block diagram of an aerosol generating device according to an embodiment.

Referring to FIG. 6, an aerosol generating device 600 may include a memory 610, a temperature sensor 620, a battery 630, a heater 640, a user interface 650, and a controller 660. The battery 630 of FIG. 6 may correspond to the battery 11 of FIGS. 1 to 3, and the heater 640 of FIG. 6 may correspond to the heater 13 of FIGS. 1 to 3. Therefore, redundant descriptions thereof are omitted.

The heater 640 may heat an aerosol generating substrate. The aerosol generating substrate may be the cigarette 2 of FIGS. 1 to 3.

The temperature sensor 620 may detect a temperature of the heater 640. In one embodiment, the temperature sensor 620 may detect the temperature of the heater 640 in real time, convert temperature information into a digital signal, and output the digital signal. The temperature sensor 620 may transmit the digital signal to the controller 660.

The controller 660 may include a pulse width modulator 661, a monitor 662, a filter 663, and a puff determination unit 664.

The controller 660 may control power supplied to the heater 640 through a power signal. The power signal may be a pulse width modulation (PWM) signal. The power signal in the form of PWM may be output by the pulse width modulator 661.

The pulse width modulator 661 may control the power supplied from the battery 630 to the heater 640 by modulating a duty (i.e., by adjusting a duty ratio) of a DC pulse. In one embodiment, the pulse width modulator 661 may include a switching element and may modulate the duty of the DC pulse by adjusting an opening/closing cycle or an opening/closing ratio of the switching element.

The controller 660 may receive temperature information from the temperature sensor 620 and control the power supplied to the heater 640 based on the temperature information. The controller 660 may control the power supplied to the heater 640 such that a temperature of the heater 640 is within a preset temperature range. For example, the controller 660 may control the power supplied to the heater 640 such that the temperature of the heater 640 is heated in a range of 100° C. to 230° C. However, the preset range is not limited to the above-described example and may be appropriately set by considering a vaporization temperature of the aerosol generating substrate.

In addition, when a user puffs, external air may flow into the heater 640. Accordingly, the temperature of the heater 640 may be reduced. The controller 660 may increase a duty value of a power signal to compensate for a decrease in temperature of the heater 640. In other words, when the temperature of the heater 640 is decreased by a user's puff, the controller 660 may increase the duty value of the power signal such that the temperature of the heater 640 is within a preset range.

The controller 660 may detect the user's puff based on the increased duty ratio. Specifically, the monitor 662 may monitor a power signal output from the pulse width modulator 661. The monitor 622 may transmit the monitored power signal to the filter 663.

The filter 663 may perform band-pass filtering on the power signal. To this end, the filter 663 may include a band-pass filter (BPF). The BPF may be a digital filter.

The filter 663 may filter the power signal through band-pass filtering, thereby removing a decrease tendency (which may be expressed as an envelope) of the power signal over time and may output a deviation value of the power signal over time.

Figure 10A:
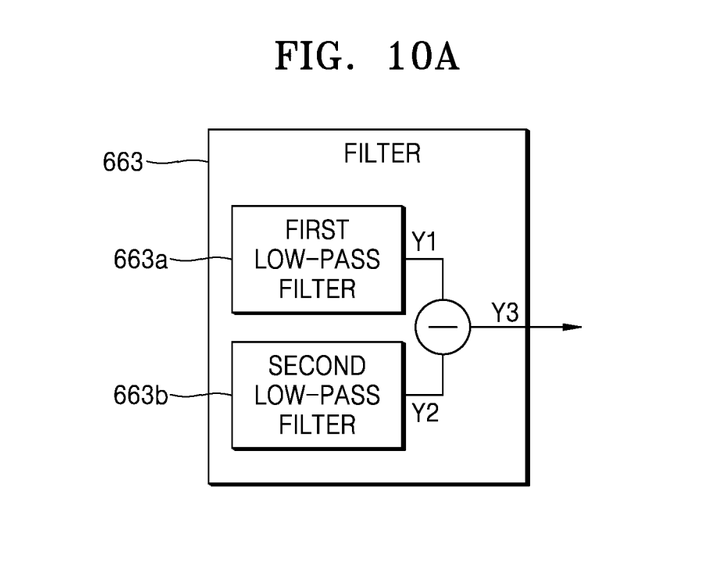
FIGS. 10A and 10B illustrate a method of implementing a band-pass filter according to an embodiment.

The BPF may include a first low-pass filter 663*a* (see FIG. 10A) and a second low-pass filter 663*b* (see FIG. 10A). A calculation amount of a low-pass filter (LPF) is less than a calculation amount of a high-pass filter (HPF), and thus, when a BPF is embodied with LPFs, a filter calculation speed may be significantly increased.

In addition, a transfer function of the LPF may be as follows.

$$H(s) = \frac{1}{\tau s + 1}$$ [Math Figure 1]

In Equation 1, H(s) is a transfer function, and T is a time constant of a LPF. The transfer function is a ratio of an output signal Y(s) to an input signal X(s), and thus, Equation 1 may be represented as follows.

$$(\tau s+)Y(S)=X(S)$$ [Math FIG. 2]

In addition, when an S-domain is converted into a time domain in Equation 2, Equation 3 may be obtained.

$$\tau \frac{d}{dt}y(t) + y(t) = x(t)$$ [Math Figure 3]

Here, when a derivative term is represented in the form of a difference of a discrete signal, Equation 4 may be obtained.

$$\tau\left(\frac{y_n - y_{n-1}}{t_s}\right) + y_n = x_n$$ [Math Figure 4]

Therefore, when a sample time is ts, a discrete output signal yn for a discrete input signal xn may be represented as follows.

$$y_n = \frac{\tau}{\tau + ts}y_{n-1} + \frac{ts}{\tau + ts}x_n = \frac{\tau \times y_{n-1} + ts \times x_n}{\tau + ts}$$ [Math Figure 5]

In Equation 5, a cutoff frequency of the LPF may be determined by a time constant τ The first LPF 663*a* may filter a power signal by using a first time constant τ1, and, the second LPF 663*b* may filter the power signal by using a second time constant τ2.

A power signal of a preset band may be obtained by subtracting a power signal passing through the second LPF 663*b* from a power signal passing through the first LPF 663*a*. In this case, a center frequency may be determined based on an average puff time of a user. In one embodiment, the center frequency may be set based on an average puff time of a general user as stipulated by the Health Canada. For example, an average puff time of a user may be 2 seconds.

The controller 660 may convert an average puff time of a user into a frequency. Accordingly, the average puff time may be converted into an average puff frequency. For example, when the average puff time is 2 seconds, the average puff frequency may be converted to 0.125 Hz according to an experiment.

The controller 660 may set the average puff frequency as a center frequency of a BPF. For example, when an average puff time of a user is 2 seconds, the center frequency may be set to 0.125 Hz.

The controller 660 may set a puff recognition time based on the average puff time of the user. For example, when the average puff time of the user is 2 seconds, the controller 660 may set 1 second to 3 seconds as the puff recognition time.

The controller 660 may convert the puff recognition time into a frequency. The puff recognition time may mean a time for effectively recognizing the user's puff. Accordingly, the puff recognition time may be converted into a puff recognition frequency. For example, when the puff recognition time is 1 second to 3 seconds, the puff recognition frequency may be set to $\frac{1}{12}$ (about 0.083) Hz to 0.25 Hz according to an experiment.

The controller 660 may set a lower cutoff frequency and a higher cutoff frequency of a BPF based on the puff recognition frequency. For example, when the puff recognition frequency is $\frac{1}{12}$ (about 0.083) Hz to 0.25 Hz, the controller 660 may set the lower cutoff frequency to $\frac{1}{12}$ (0.083) Hz and set the higher cutoff frequency to 0.25 Hz.

The filter 663 may transmit the filtered power signal to the puff determination unit 664. The puff determination unit 664 may detect a user's puff based on the filtered power signal.

The puff determination unit 664 may compare the filtered power signal with a preset threshold. In addition, the puff determination unit 664 may determine the filtered power signal greater than or equal to the preset threshold as the user's puff. A threshold may be set based on an average value of the maximum value and the minimum value of the power signal or the filtered power signal in each puff period but is not limited thereto, and any value between the maximum value and the minimum value of the filtered power signal may be selected as the threshold.

The user interface 650 may provide information on a state of the aerosol generating device 600 to a user. The user interface 650 may include various interfaces such as a display or a lamp that outputs visual information, a motor that outputs tactile information, a speaker that outputs sound information, a terminal for data communication with an input/output (I/O) interface (for example, a button or a touch screen) that receives information input from a user or outputs information to the user or for receiving charging power, and a communication interfacing module for performing wireless communication (for example, WI-FI, WI-FI Direct, Bluetooth, near-field communication (NFC), or so on) with an external device.

According to embodiments, the aerosol generating device 600 may selectively include only some of the examples of the various user interfaces 650 described above.

The memory 610 is hardware that stores various types of data processed in the aerosol generating device 600 and may store data processed by the controller 660 and data to be processed thereby. The memory 610 may include various types of memories such as random access memory (RAM) such as dynamic random access memory (DRAM) or static random access memory (SRAM), read-only memory (ROM), and electrically erasable programmable read-only memory (EEPROM).

In addition, an internal structure of the aerosol generating device 600 is not limited to the structure illustrated in FIG. 6. Those skilled in the art relating to the present embodiment will be appreciate that some of the hardware configurations illustrated in FIG. 6 may be omitted or a new configuration may be added thereto depending on the design of the aerosol generating device 600.

Figure 7:
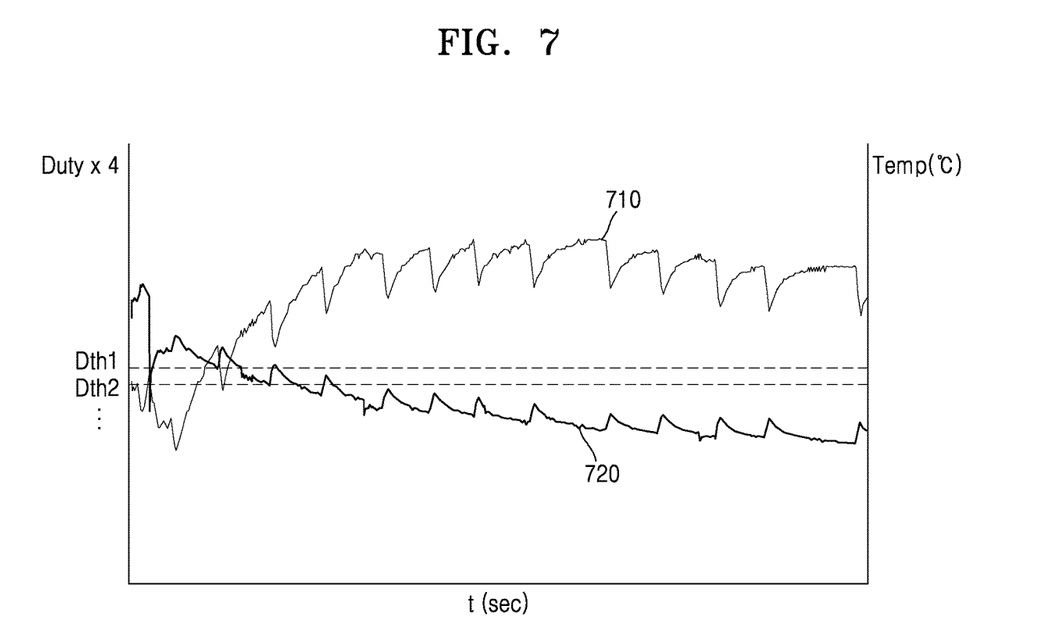
FIG. 7 is a view illustrating a power control method according to a heater temperature.

FIG. 7 is a view illustrating a power control method according to a heater temperature.

FIG. 7 illustrates a temperature sensing value 710 of the temperature sensor 620 and a power signal 720 of the controller 660. In FIG. 7, an x-axis denotes a time, and a y-axis denotes a duty and a temperature. In FIG. 7, a duty value is plotted with a scale factor of four for comparison with the temperature sensing value 710.

Referring to FIG. 7, the controller 660 may control power supplied to the heater 640 such that a temperature of the heater 640 is within a preset temperature range. For example, the controller 660 may control the power supplied to the heater 640 such that the temperature of the heater 640 is heated within a range of 100° C. to 230° C. However, the preset temperature range is not limited to the above-described example and may be appropriately set by considering vaporization temperature of the aerosol generating substrate.

When a user puffs, external air may flow into the heater 640. Accordingly, the temperature of the heater 640 may be decreased, and the controller 660 may increase a duty value of the power signal 720 to compensate for the decrease in temperature of the heater 640. In other words, when the temperature of the heater 640 is decreased by the user's puff, the controller 660 may increase the duty value of the power signal 720 such that the temperature of the heater 640 is within the preset temperature range.

The controller 660 may detect the user's puff based on the increased duty value (i.e., based on the increased duty ratio).

In addition, the power signal 720 of FIG. 7 has a small difference between the maximum value and the minimum value of the duty in one period of the puff. In addition, the power signal 720 of FIG. 7 has a large variation of the maximum values of duties in each puff period. Accordingly, the controller 660 may not use a fixed threshold to detect a user's puff. Instead, the controller 660 may set different thresholds Dth1, Dth2, . . . in each puff period. In this case, there is a problem that a rapid puff detection may not be made due to an increase in calculation amount of the controller 660. In addition, there is a problem that the controller 660 may not accurately detect the user's puff because a difference between the maximum value and the minimum value of the duty is small within one period of the puff.

In order to solve these problems, an embodiment may adopt a digital filter and detects a user's puff based on the power signal to which the digital filter is applied.

Figure 8:
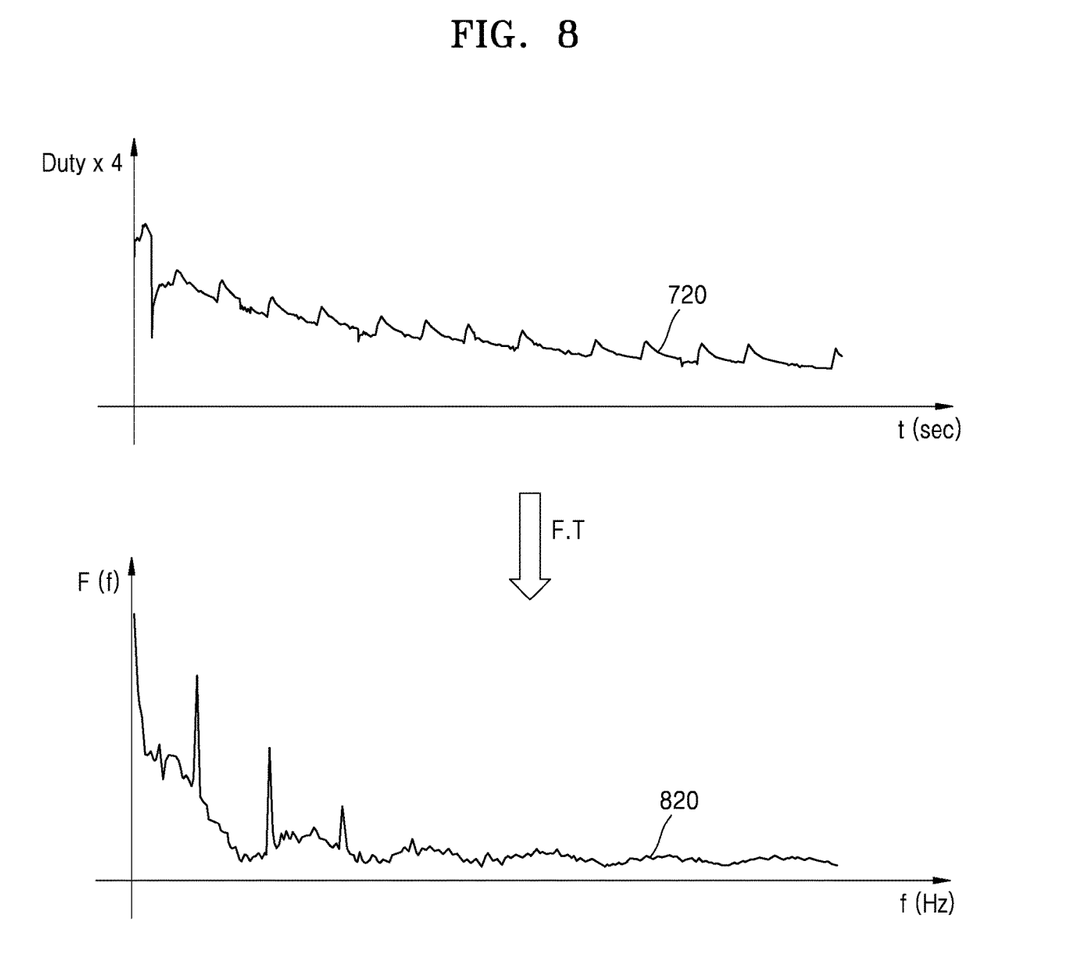
FIG. 8 illustrates a frequency-converted power signal according to an embodiment.
Figure 9:
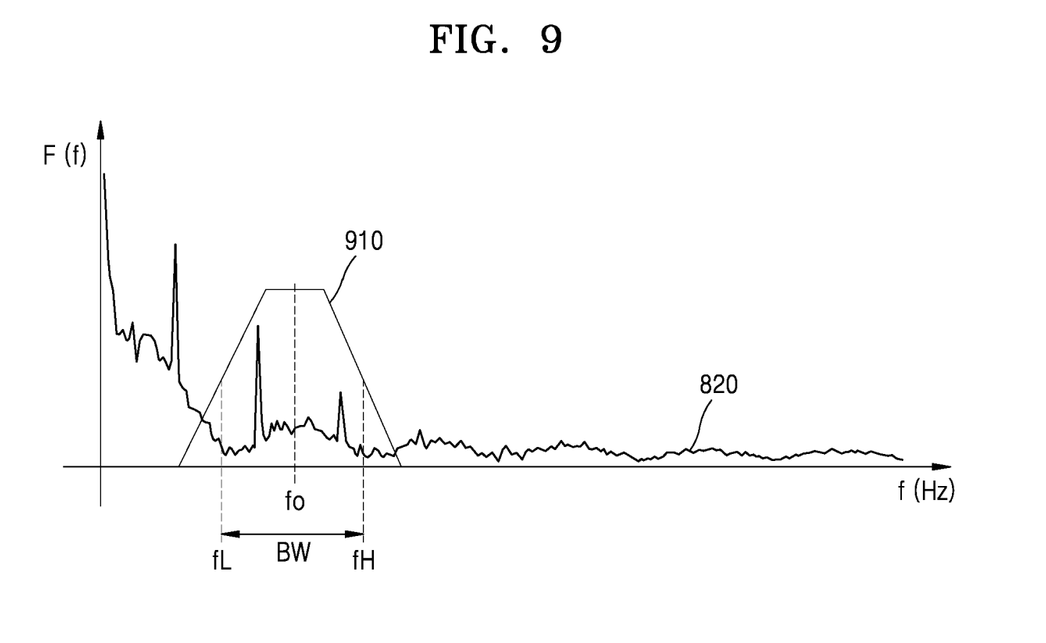
FIG. 9 is a diagram illustrating a method of operating a band-pass filter according to an embodiment.
Figure 10B:
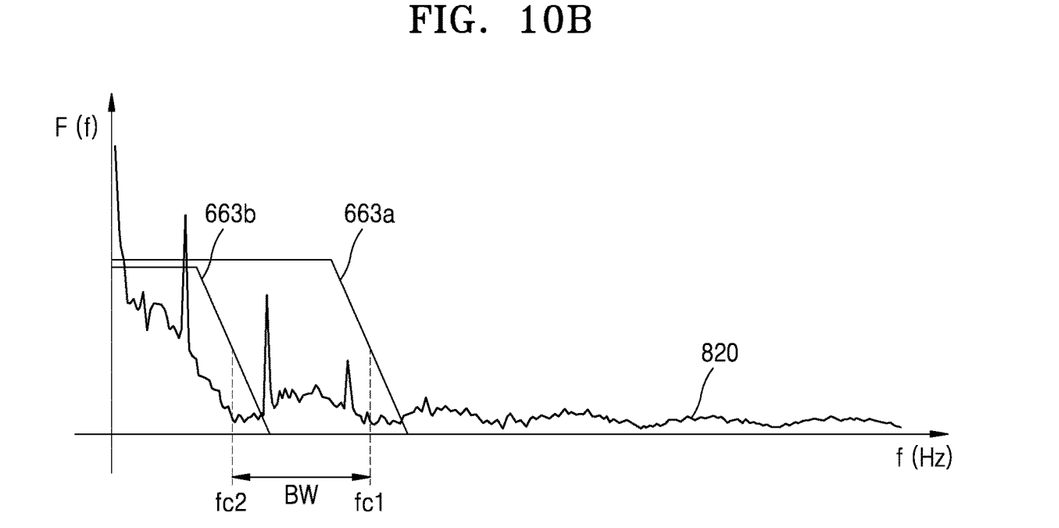
Figure 11:
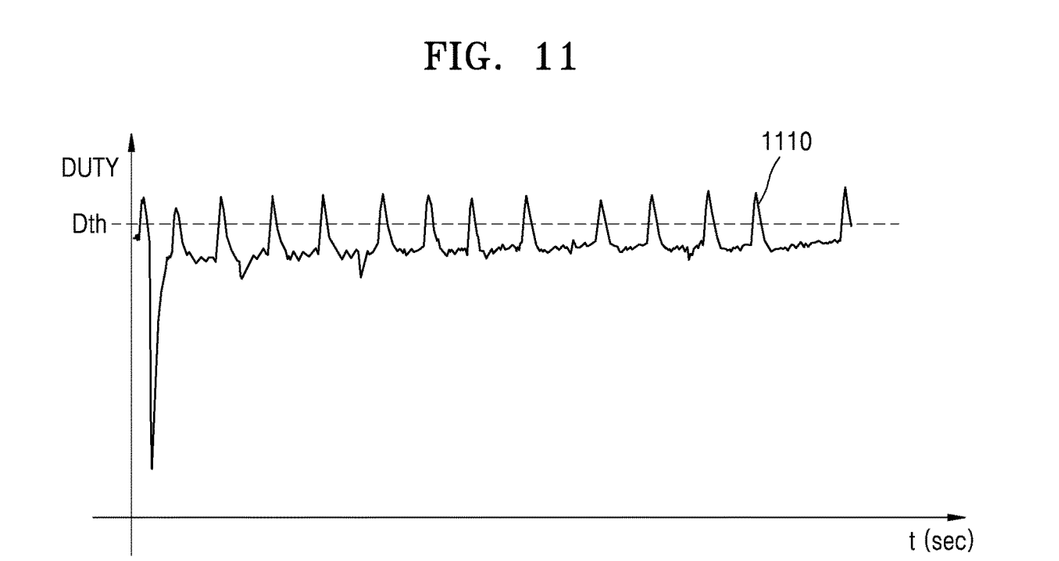
FIG. 11 is a diagram illustrating a method of comparing a filtered power signal and a preset threshold, according to an embodiment.

FIG. 8 illustrates a frequency-converted power signal, FIG. 9 is a diagram illustrating a method of operating a BPF, FIGS. 10A and 10B illustrate a method of implementing the BPF, and FIG. 11 is a diagram illustrating a method of comparing a filtered power signal and a preset threshold.

Referring to FIGS. 8 to 11, the controller 660 may convert the power signal 720 in a time domain into a power signal 820 in a frequency domain. For example, the controller 660 may convert the power signal 720 in a time domain into the power signal 820 in a frequency domain by using a Fourier Transform (FT), a Fast Fourier Transform (FFT), a Discrete Fourier Transform (DFT), and so on. However, the method of converting a frequency domain is not limited to the above-described examples.

In FIG. 9, the filter 663 may band-pass-filter the power signal 820 in the frequency domain. To this end, the filter 663 may include a BPF 910.

A center frequency fo of the BPF 910 may be set based on an average puff time of a user. For example, when the average puff time of the user is 2 seconds, the center frequency fo may be set to 0.125 Hz according to an experiment.

A lower cutoff frequency fL and a higher cutoff frequency fH of the BPF 910 may be set based on a preset puff recognition time. For example, when the average puff time of the user is 2 seconds, the puff recognition time may be set to 1 to 3 seconds. In addition, when the puff recognition time is 1 second to 3 seconds, the lower cutoff frequency may be set to 1/12 (0.083) Hz, and the higher cutoff frequency may be set to 0.25 Hz. Accordingly, a bandwidth BW of the BPF 910 may be set to 1/6 (0.167) Hz.

The BPF 910 may include the first LPF 663a and the second LPF 663b as illustrated in FIGS. 10A to 10B.

Specifically, the filter 663 may include the first LPF 663a and the second LPF 663b. Unlike FIG. 10B, pass gains of the first LPF 663a and the second LPF 663b may be the same.

The first LPF 663a may remove frequencies higher than or equal to a first cutoff frequency fc1. The second LPF 663b may remove frequencies higher than or equal to a second cutoff frequency fc2. A difference between the first cutoff frequency fc1 and the second cutoff frequency fc2 may correspond to the bandwidth BW of the BPF 910.

The first LPF 663a may output a first filtering signal Y1 by filtering a power signal. The second LPF 663b may output a second filtering signal Y2 by filtering a power signal.

The filter 663 may output a third filtering signal Y3 by subtracting the second filtering signal Y2 from the first filtering signal Y1. The third filtering signal Y3 may be a band-pass-filtered power signal.

In this case, since the BPF is embodied using only LPFs, a filter calculation speed may be remarkably increased.

FIG. 11 shows an example of a time domain signal corresponding to the band-pass-filtered power signal Y3.

Unlike FIG. 7, a filtered power signal 1110 of FIG. 11 has a large difference between a maximum value and a minimum value of a duty within one period of a puff. In addition, the filtered power signal 1110 of FIG. 11 has a small variation of maximum values of duties obtained in each puff period. Accordingly, the controller 660 may use a fixed threshold value Dth to detect a user's puff. In addition, since there is the large difference between the maximum value and the minimum value of the duty within one period of a puff, the controller 660 may accurately detect the user's puff.

The puff determination unit 664 may compare the filtered power signal with the preset threshold Dth, and determine that a user's puff has occurred when the filtered power signal is greater than or equal to the preset threshold.

Figure 12:
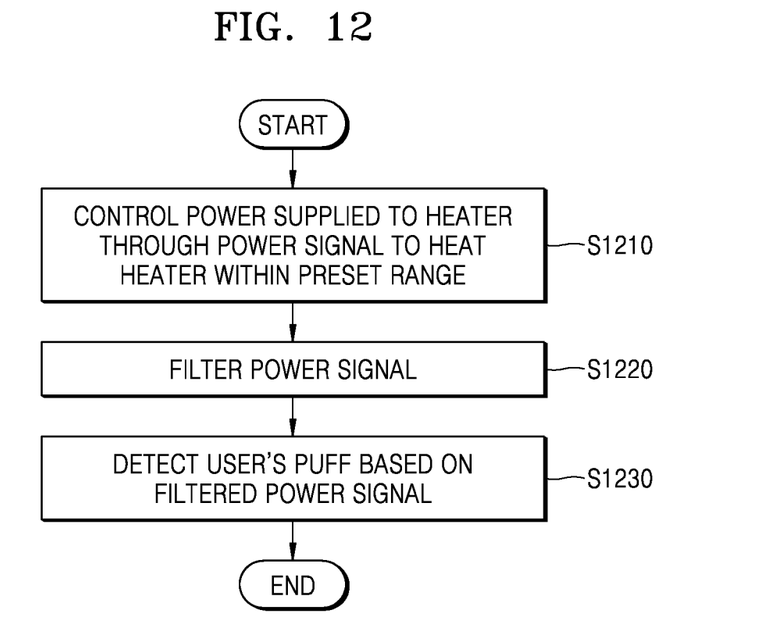
FIG. 12 is a flowchart illustrating an operating method of an aerosol generating device according to an embodiment.

FIG. 12 is a flowchart illustrating an operating method of an aerosol generating device according to an embodiment.

Referring to FIG. 12, in step S1210, the controller 660 may control power supplied to the heater 640 through a power signal to heat a temperature of the heater 640 within a preset range.

The power signal may be a pulse width modulation signal. The controller 660 may control power supplied from the battery 630 to the heater 640 by modulating a duty of a DC pulse. In one embodiment, the pulse width modulator 661 may include a switching element and may modulate the duty of the DC pulse by adjusting an opening/closing cycle or an opening/closing ratio of the switching element.

The controller 660 may receive temperature information from the temperature sensor 620 and control the power supplied to the heater 640 based on the temperature information. The controller 660 may control the power supplied to the heater 640 such that a temperature of the heater 640 is within a preset temperature range.

In step S1220, the controller 660 may filter a power signal.

The controller 660 may band-pass-filter the power signal. To this end, the controller 660 may include a BPF. The BPF may be a digital filter.

A center frequency of the controller 660 may be set based on an average puff time of a user. For example, when the average puff time of the user is 2 seconds, and the center frequency may be set to 0.125 Hz according to an experiment.

The controller 660 may set a lower cutoff frequency and a higher cutoff frequency of the BPF based on a preset puff recognition time. For example, when the average puff time of the user is 2 seconds, the puff recognition time may be set to 1 second to 3 seconds. In addition, when the puff recognition time is 1 second to 3 seconds, the lower cutoff frequency may be set to $\frac{1}{12}$ (0.083) Hz, and the higher cutoff frequency may be set to 0.25 Hz according to an experiment. Accordingly, the bandwidth BW of the BPF 910 may be set to $\frac{1}{6}$ (0.167) Hz.

In step S1230, the controller 660 may detect a user's puff based on the filtered power signal.

The controller 660 may detect the user's puff based on a fixed threshold. The controller 660 may determine that the user's puff has occurred when the filtered power signal is greater than or equal to a preset threshold.

The controller 660 may count the user's puff. In addition, the controller 660 may control internal components of the aerosol generating device 600 based on the counted number of the user's puffs. For example, the controller 660 may display the number of remaining puffs via the user interface 650. However, this is only an example, and the operation of the controller 660 based on the user's puff is not limited thereto.

Figure 13:
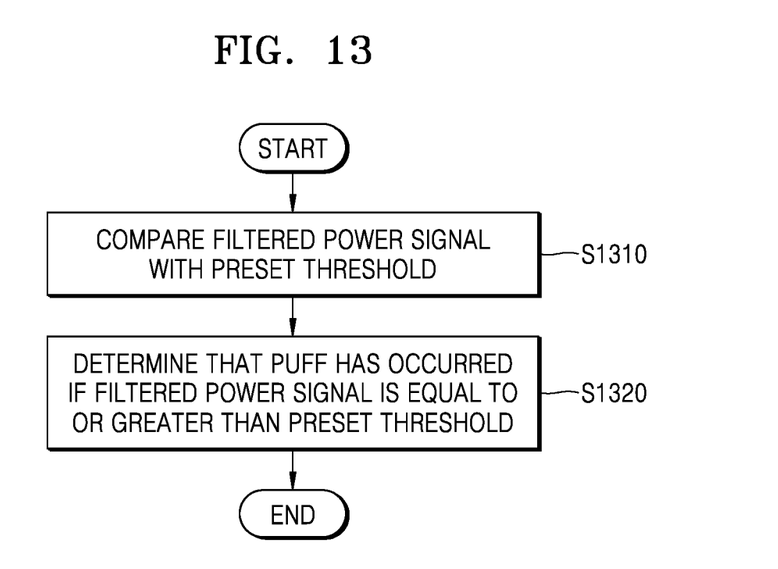
FIG. 13 is a diagram illustrating a method of detecting a puff, according to an embodiment.

FIG. 13 is a diagram illustrating the method of detecting the puff.

Referring to FIG. 13, in step S1310, the controller 660 may compare the filtered power signal with the preset threshold.

In step S1320, the controller 660 may determine that the user's puff has occurred when the filtered power signal is greater than or equal to a threshold. As aforementioned, since the filtered power signal according to the embodiments has a large difference between a maximum value and a minimum value of a duty within one period of a puff, the controller 660 may accurately detect the user's puff.

At least one of the components, elements, modules or units (collectively "components" in this paragraph) represented by a block in the drawings such as the controller 660, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those skilled in the technical field relating to the present embodiment will appreciate that the embodiments may be implemented in a modified form within a range without departing from the essential characteristics of the above-described description. Therefore, the disclosed methods have to be considered from an explanatory point of view rather than a limiting point of view. The scope of the present disclosure is represented in the claims rather than the above description, and all differences within the scope equivalent thereto should be construed as being included in the present disclosure.

The invention claimed is:

1. An aerosol generating device comprising:
   a heater configured to heat an aerosol generating substrate;
   a temperature sensor configured to detect a temperature of the heater that heats the aerosol generating substrate; and
   a controller configured to control power supplied to the heater through a power signal such that the heater is heated within a preset temperature range,
   wherein the controller is further configured to filter the power signal that controls the power supplied to the heater, and detect a user's puff based on the filtered power signal.

2. The aerosol generating device of claim 1, wherein the power signal is a pulse width modulation signal.

3. The aerosol generating device of claim 2, wherein the controller is further configured to increase a duty value of the pulse width modulation signal in response to a decrease in the temperature of the heater.

4. The aerosol generating device of claim 1, wherein the controller comprises a band-pass filter configured to filter the power signal.

5. The aerosol generating device of claim 4, wherein the controller is further configured to set a center frequency of the band-pass filter based on an average puff time of a user.

6. The aerosol generating device of claim 5, wherein the controller is further configured to determine that the average puff time is 2 seconds.

7. The aerosol generating device of claim 4, wherein the controller is further configured to set frequencies of the band-pass filter such that a center frequency of the band-pass filter is 0.125 Hz, a lower cutoff frequency of the band-pass filter is 0.083 Hz, and a higher cutoff frequency of the band-pass filter is 0.25 Hz.

8. The aerosol generating device of claim 4, wherein the band-pass filter comprises a first low-pass filter and a second low-pass filter.

9. The aerosol generating device of claim 8, wherein the controller is further configured to set frequencies of the band-pass filter such that a first cutoff frequency of the first low-pass filter is 0.25 Hz, and a second cutoff frequency of the second low-pass filter is 0.083 Hz.

10. The aerosol generating device of claim 1, wherein the controller is further configured to compare the filtered power signal with a preset threshold, and determine that the user's puff has occurred based on the filtered power signal being greater than or equal to the preset threshold.

11. The aerosol generating device of claim 10, wherein the controller is configured to send the power signal to the heater.

* * * * *